United States Patent
Baldemair et al.

(10) Patent No.: US 11,817,947 B2
(45) Date of Patent: Nov. 14, 2023

(54) CODE-RATE-DEPENDENT MODULATION TECHNIQUES

(71) Applicant: Telefonaktiebolaget LM Ericsson (publ), Stockholm (SE)

(72) Inventors: Robert Baldemair, Solna (SE); Erik Dahlman, Stockholm (SE); Sorour Falahati, Stockholm (SE); Havish Koorapaty, Saratoga, CA (US); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/647,321

(22) PCT Filed: Sep. 13, 2018

(86) PCT No.: PCT/EP2018/074812
§ 371 (c)(1),
(2) Date: Mar. 13, 2020

(87) PCT Pub. No.: WO2019/053165
PCT Pub. Date: Mar. 21, 2019

(65) Prior Publication Data
US 2021/0036801 A1    Feb. 4, 2021

Related U.S. Application Data

(60) Provisional application No. 62/559,188, filed on Sep. 15, 2017.

(51) Int. Cl.
*H04W 4/00*     (2018.01)
*H04L 1/00*     (2006.01)
(Continued)

(52) U.S. Cl.
CPC .......... *H04L 1/0003* (2013.01); *H04L 1/0021* (2013.01); *H04L 27/0008* (2013.01);
(Continued)

(58) Field of Classification Search
None
See application file for complete search history.

(56) References Cited

U.S. PATENT DOCUMENTS

2002/0072885 A1    6/2002  Tang
2005/0262421 A1   11/2005  Tran et al.
(Continued)

FOREIGN PATENT DOCUMENTS

EP    2600549 A2    6/2013
EP    2639983 A1    9/2013
(Continued)

OTHER PUBLICATIONS

Ericsson, "On the Design of Long PUCCH for more than 2 bits", 3GPP TSG RAN WG1 Meeting AH_NR#3, Nagoya, Japan, Sep. 18, 2017, pp. 1-16, R1-1716587, 3GPP.
(Continued)

*Primary Examiner* — Bob A Phunkulh
(74) *Attorney, Agent, or Firm* — COATS & BENNETT, PLLC

(57) ABSTRACT

A modulation technique, such as for example either Pi/2 BPSK or QPSK, is selected for transmission, based on a characteristic of the data to be transmitted, or the physical channel over which it is to be transmitted. The data characteristic may be the coding rate, or characteristics indirectly related to the coding rate, such as the number of coded bits or number of uncoded bits (payload size). The physical channel characteristic may for example be the physical channel bandwidth, the physical channel length, a number of physical channel modulation symbols, a number of the
(Continued)

physical channel resource elements used for the data to be transmitted, or a number of the physical channel modulation symbols carrying the data to be transmitted.

12 Claims, 9 Drawing Sheets

(51) Int. Cl.
*H04L 27/00* (2006.01)
*H04L 27/20* (2006.01)
*H04W 72/23* (2023.01)
*H04W 72/21* (2023.01)
*H04L 5/00* (2006.01)

(52) U.S. Cl.
CPC ...... *H04L 27/0012* (2013.01); *H04L 27/2082* (2013.01); *H04L 5/0007* (2013.01); *H04W 72/21* (2023.01); *H04W 72/23* (2023.01)

(56) References Cited

U.S. PATENT DOCUMENTS

| | | | | |
|---|---|---|---|---|
| 2009/0022241 A1* | 1/2009 | Fukuoka | ............... | H04L 1/0003 375/298 |
| 2009/0279493 A1* | 11/2009 | Gaal | ............... | H04W 72/04 370/329 |
| 2011/0200000 A1* | 8/2011 | Nishio | ............... | H04L 5/0055 370/329 |
| 2011/0222500 A1* | 9/2011 | Takaoka | ............... | H04L 27/2636 370/329 |
| 2011/0249644 A1* | 10/2011 | Boariu | ............... | H04W 72/042 370/329 |
| 2011/0255490 A1* | 10/2011 | Chuck | ............... | H04W 74/02 370/329 |
| 2012/0039280 A1* | 2/2012 | Chen | ............... | H04B 17/24 370/329 |
| 2012/0106373 A1* | 5/2012 | Gaal | ............... | H04L 5/0048 370/252 |
| 2012/0263060 A1* | 10/2012 | Suzuki | ............... | H04W 52/365 370/252 |
| 2013/0010722 A1* | 1/2013 | Suzuki | ............... | H04W 74/08 370/329 |
| 2013/0051341 A1* | 2/2013 | Suzuki | ............... | H04L 5/0005 370/329 |
| 2013/0102320 A1* | 4/2013 | Suzuki | ............... | H04W 72/042 455/452.1 |
| 2014/0269584 A1* | 9/2014 | Wei | ............... | H04L 65/80 370/329 |
| 2015/0082116 A1* | 3/2015 | Kyung | ............... | H03M 13/112 714/758 |
| 2015/0326341 A1 | 11/2015 | Lorca Hernando | | |
| 2016/0073394 A1 | 3/2016 | Kim et al. | | |
| 2016/0183244 A1* | 6/2016 | Papasakellariou | .... | H04L 5/0057 370/329 |
| 2017/0374638 A1* | 12/2017 | Han | ............... | G01S 1/20 |
| 2019/0068334 A1* | 2/2019 | Stern-Berkowitz | ............... | H04L 1/1812 |
| 2019/0098622 A1* | 3/2019 | Lee | ............... | H04W 72/0446 |
| 2019/0123881 A1* | 4/2019 | Lee | ............... | H04L 5/0057 |
| 2020/0236712 A1* | 7/2020 | Kwak | ............... | H04W 74/0833 |
| 2021/0022117 A1* | 1/2021 | Yi | ............... | H04L 5/0048 |
| 2021/0203450 A1* | 7/2021 | Xu | ............... | H04L 1/1896 |
| 2022/0190989 A1* | 6/2022 | Tiirola | ............... | H04L 5/0094 |

FOREIGN PATENT DOCUMENTS

| | | |
|---|---|---|
| EP | 3413492 A1 | 12/2018 |
| GB | 2519661 A | 4/2015 |
| WO | 2009094902 A1 | 8/2009 |
| WO | 2017133552 A1 | 8/2017 |

OTHER PUBLICATIONS

Ericsson, "On the Design of Long PUCCH for up to 2 bits", 3GPP TSG RAN WG1 Meeting AH_NR#3, Nagoya, Japan, Sep. 18, 2017, pp. 1-8, R1-1716586, 3GPP.

llth et al., "Views on long duration PUCCH", 3GPP TSG RAN WG1 Meeting-NR#2, Qingdao, China, Jun. 27, 2017, p. 1, R1-1710590, 3GPP.

Ericsson, "On the Design of Long PUCCH for Small Payloads", 3GPP TSG RAN WG1 Meeting #88bis, Spokane, US, Apr. 3, 2017, pp. 1-12, R1-1706038, 3GPP.

Ericsson, "On the Design of Long PUCCH for Small Payloads", 3GPP TSG-RAN WG1 #89, Hangzhou, China, May 15, 2017, pp. 1-6, R1-1709083, 3GPP.

3rd Generation Partnership Project, "RAN1 Chairman's Notes", 3GPP TSG RAN WG1 Meeting #90, Prague, Czech Republic, Aug. 21, 2017, pp. 1-143, 3GPP.

3rd Generation Partnership Project, "RAN1 Chairman's Notes", 3GPP TSG RAN WG1 Meeting #89, Hangzhou, P.R. China, May 15, 2017, pp. 1-144, 3GPP.

3rd Generation Partnership Project, "RAN1 Chairman's Notes", 3GPP TSG RAN WG1 NR Ad-Hoc#2, Qingdao, P.R. China, Jun. 27, 2017, pp. 1-77, 3GPP.

* cited by examiner ated subcarriers and OFDM modulated. Each "Gen. sym." block in FIG. 1 includes DFT-precoding, mapping to subcarriers, and OFDM modulation. To harvest frequency diversity, frequency hopping can be applied as shown in FIG. 1. The number of allocated Physical Resource Blocks (PRBs) can be variable. De-Modulation Reference Signals (DM-RS) are mapped to separate symbols to maintain low PAPR or CM.

CODE-RATE-DEPENDENT MODULATION TECHNIQUES

RELATED APPLICATIONS

This application claims priority to U.S. Provisional Patent Application Ser. No. 62/559,188, titled Code-Rate-Dependent Modulation Techniques, filed 15 Sep. 2017.

TECHNICAL FIELD

The present invention relates generally to wireless communication networks, and in particular to the selection of a modulation technique for transmitting data across a physical channel in response to a characteristic of the data or the physical channel.

BACKGROUND

A number of modulation techniques are known in the wireless communication arts. For example, Phase Shift Keying (PSK) is a digital modulation process which comprises modulating the phase of a carrier signal at precise times to represent (encoded) data to be transmitted on the carrier. Various forms of PSK are known, such as Binary Phase Shift Keying (BPSK) and Quadrature Phase Shift Keying (QPSK).

Pi/2 BPSK

In pi/2 BPSK modulation, the modulation axis is rotated by 90 degrees (pi/2) between time-adjacent modulation symbols. For example, in even symbols the BPSK modulation symbols are ±1 while in odd symbols they are ±j (or the other way around). This avoids zero crossing in 180 degree transitions, e.g., from +1→−1 since this transition would now be, e.g., +1→−j. Avoiding zero crossing reduces power metrics such as the Peak to Average Power Ratio (PAPR) and cubic metric (CM). This results in less required power backoff in the UE power amplifier. Less power backoff allows higher UE output powers.

Long PUCCH

New Radio (NR), the 5th generation standard being developed by the Third Generation Partnership Project (3GPP), defines a multitude of different formats for physical channels. Aspects of the present disclosure are described herein with respect to the Physical Uplink Control Channel (PUCCH), although this is for context of disclosure only, and should not be considered limiting. Some of these are known as long PUCCH formats. For long PUCCH format, NR defines a format for 1-2 bit and another format for more than 2 bit.

FIG. 1 shows a schematic representation of long PUCCH format for more than 2 bits. Long PUCCH comes with variable length ranging from four symbols to a complete slot and even multiple slots. The Uplink Control Information (UCI) is encoded and mapped to modulation symbols. UCI may include information such as Hybrid Automatic Repeat Request (HARQ) acknowledgement (ACK) or negative acknowledgement (NAK); Channel Quality Information (CQI) or Channel State Information (CSI); Scheduling Request (SR); Multiple Input Multiple Output (MIMO) information such as beamforming related parameters; and any combination of these UCI types.

The modulation symbols are grouped into groups of modulation symbols (one group per OFDM symbol). Discrate Fourier Transform (DFT) precoding is applied to the symbols per group to obtain a low PAPR or CM. The DFT-spread modulation symbols are assigned to the allocated subcarriers and OFDM modulated. Each "Gen. sym." block in FIG. 1 includes DFT-precoding, mapping to subcarriers, and OFDM modulation. To harvest frequency diversity, frequency hopping can be applied as shown in FIG. 1. The number of allocated Physical Resource Blocks (PRBs) can be variable. De-Modulation Reference Signals (DM-RS) are mapped to separate symbols to maintain low PAPR or CM.

The modulation technique shown in FIG. 1 is QPSK. The modulation technique could also be BPSK or pi/2 BPSK. FIGS. 2A and 2B show link performance curves for long PUCCH with 14 symbols using QPSK and pi/2 BPSK, for a TDL-C 300 ns model and TDL-C 1000 ns model, respectively. The PUCCH bandwidth is 1 PRB. PUCCH applies frequency-hopping and 2 DM-RS symbols are inserted per hop. For small payloads there is no performance difference between pi/2 BPSK and QPSK. With increasing payload size, QPSK starts to outperform pi/2 BPSK and at payload sizes of 80 bit there is a performance gain of around 3.5 dB for QPSK.

With QPSK mapping, the number of coded bits doubles, as compared to pi/2 BPSK, which results in halving the code rate. At low payload sizes (e.g., up to 40 bits) even with BPSK the code rate is small; halving the code rate does not give much additional coding gain except 3 dB energy/repetition gain. However, BPSK is a real-valued modulation technique, while QPSK is complex valued. Thus, for QPSK also the noise variance increases by 3 dB. This results in equal performance for pi/2 BPSK and QPSK for low payloads. For larger payloads, the coding gain increases, and halving the coding gain yields more than just 3 dB energy/repetition gain, leading to an advantage for QPSK.

What is not considered in FIG. 1 is the PAPR or CM gain of pi/2 BPSK over QPSK. The lower PAPR or CM of pi/2 BPSK requires less power backoff in the UE power amplifier, i.e., pi/2 BPSK enables higher output powers leading to an advantage of pi/2 BPSK.

For small payload sizes, the coding rate effect together with the PAPR or CM effect leads to an advantage for pi/2 BPSK. For large payload sizes, when coding rate gain is larger than PAPR or CM loss, QPSK has an advantage.

Neither pi/2 BPSK nor QPSK has a clear advantage across all payload sizes supported by long PUCCH. For small payload size (low code rate) pi/2 BPSK is better while for large payload sizes (high code rate) QPSK is better.

The Background section of this document is provided to place embodiments of the present invention in technological and operational context, to assist those of skill in the art in understanding their scope and utility. Approaches descried in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention described and claimed herein, a modulation technique, such as for example either Pi/2 BPSK or QPSK, is selected for transmission, based on a characteristic of the data or the physical channel. The data characteristic may be the coding rate, or characteristics indirectly related to the coding rate, such as the number of coded bits or number of uncoded bits (payload size). The physical channel characteristic may for example be the physical channel bandwidth, the physical channel length, a number of physical channel modulation symbols, a number of the physical channel resource elements used for the data to be transmitted, or a number of the physical channel modulation symbols carrying the data to be transmitted.

The modulation technique of long PUCCH with more than 2 bits is selected based on at least one of (or combination of) PUCCH code rate, payload size, PUCCH bandwidth, PUCCH length, number of PUCCH modulation symbols, number of PUCCH resource elements used for UCI. The threshold applied to any of above parameter when to switch between pi/2 BPSK and QPSK can either be fixed in the specification or signaled to the UE. Alternatively, it can be signaled to the UE to either apply pi/2 BPSK or QPSK.

Modulation technique for long PUCCH >2 bit (or in general any channel applying channel coding) is selected based on a characteristic of the data to be transmitted or the physical channel. In one aspect, the characteristic is the least code rate, or another parameter affecting the code rate.

For each characteristic (e.g., code rate) the optimal modulation technique can be selected. This results in increased physical channel performance, either enabling higher payload sizes or improved coverage.

One embodiment relates to a method performed by a wireless device of selecting a modulation technique for transmitting data across a physical channel. The data to be transmitted is encoded. A characteristic of the data or the physical channel is determined. A first or second modulation technique is selected in response to the determined characteristic. Modulation symbols are generated from the encoded data using the selected modulation technique.

Another embodiment relates to a wireless device operative in a wireless communication network. The wireless device is also operative to select a modulation technique for transmitting data across a physical channel. The wireless device includes a transceiver and processing circuitry operatively connected to the transceiver. The processing circuitry is adapted to encode the data to be transmitted; determine a characteristic of the data or the physical channel; select a first or second modulation technique in response to the determined characteristic; and generate modulation symbols from the encoded data using the selected modulation technique.

Yet another embodiment relates to a method, performed by a base station, of receiving a data transmitted across a physical channel. A signal transmitted by a wireless device on a physical channel is received. A characteristic of the data transmitted or the physical channel is determined. A first or second modulation technique is selected in response to the determined characteristic. Data in the received signal is demodulated using the selected modulation technique.

Still another embodiment relates to a base station operative in a wireless communication network wherein one or more wireless devices transmit modulated data across a physical channel to the base station. The base station includes a transceiver and processing circuitry operatively connected to the transceiver. The processing circuitry is adapted to receive a signal transmitted by a wireless device on a physical channel; determine a characteristic of the data transmitted or the physical channel; select a first or second modulation technique in response to the determined characteristic; and demodulate data in the received signal using the selected modulation technique.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
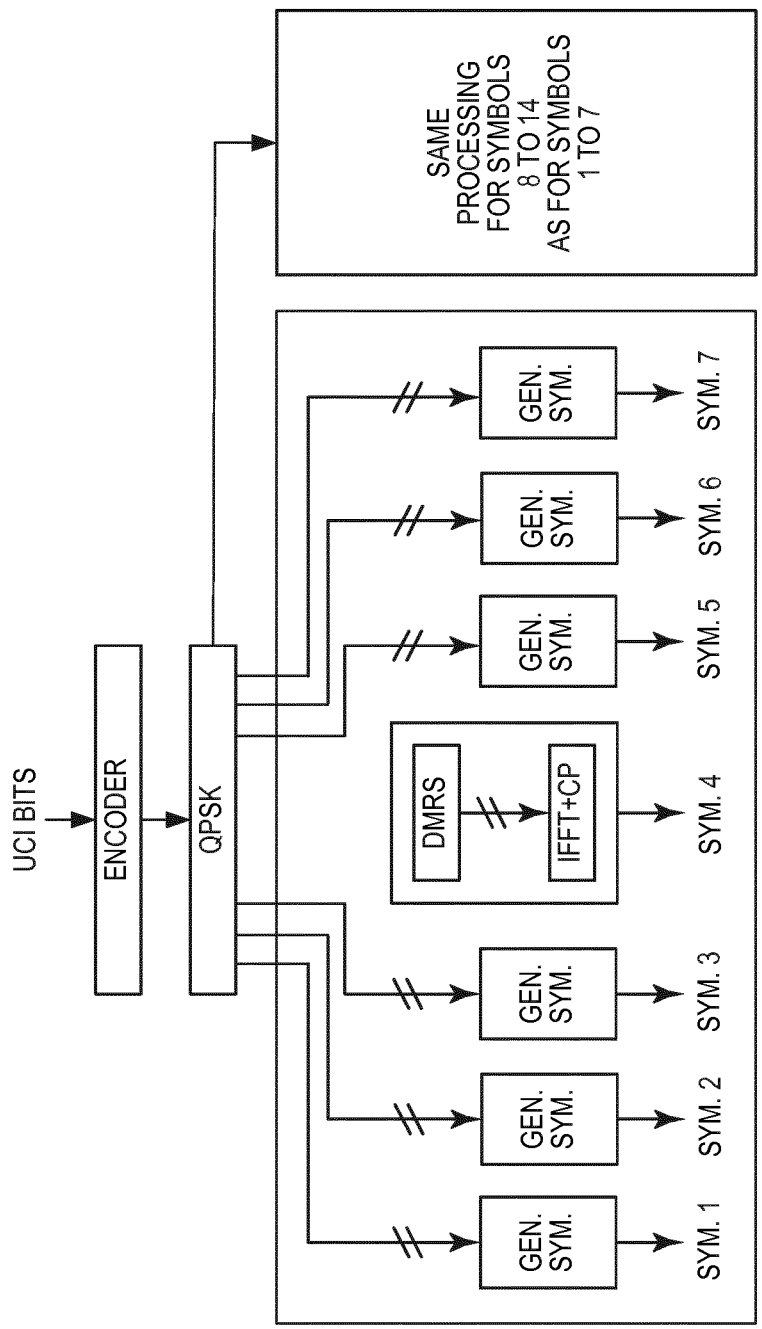
FIG. 1 is block diagram of encoding and modulation for long PUCCH.

Additional embodiments will now be described. At least some of these embodiments may be described as applicable in certain contexts and/or wireless network types for illustrative purposes, but the embodiments are similarly applicable in other contexts and/or wireless network types not explicitly described. In particular, embodiments are described herein in the context of the NR long PUCCH format (See FIG. 1), which is an uplink physical control channel. However, this is for the purpose of description and explanation only. In general, embodiments may be applicable to the selection of a modulation technique for downlink as well as uplink physical channels, and for physical channels other than PUCCH.

Figure 2A:
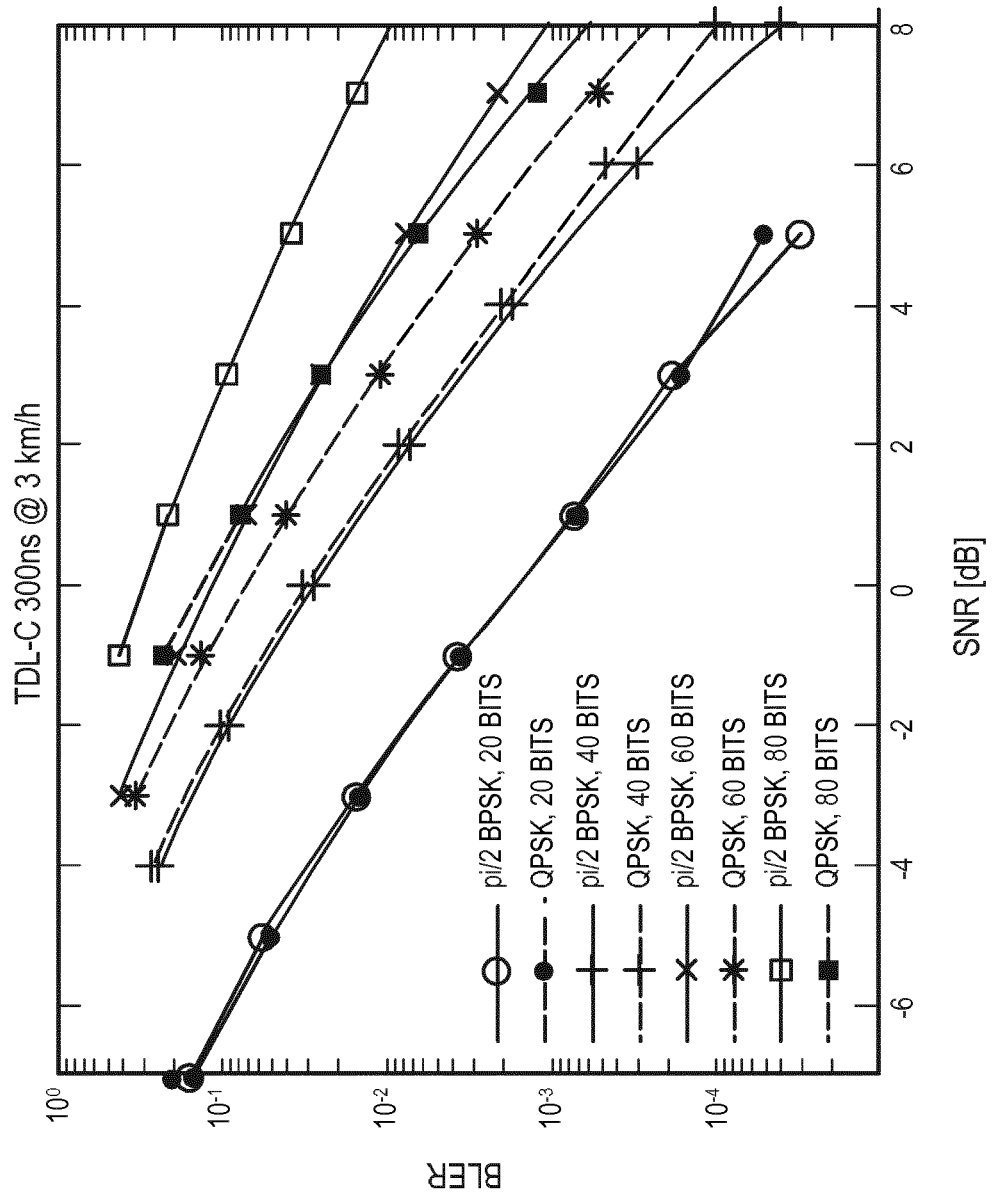
FIGS. 2A and 2B are graphs of BLER as a function of SNR for different length bit sequences modulated with both Pi/2 BPSK and QPSK, for TDL-C 300 ns and 1000 ns models, respectively.
Figure 2B:
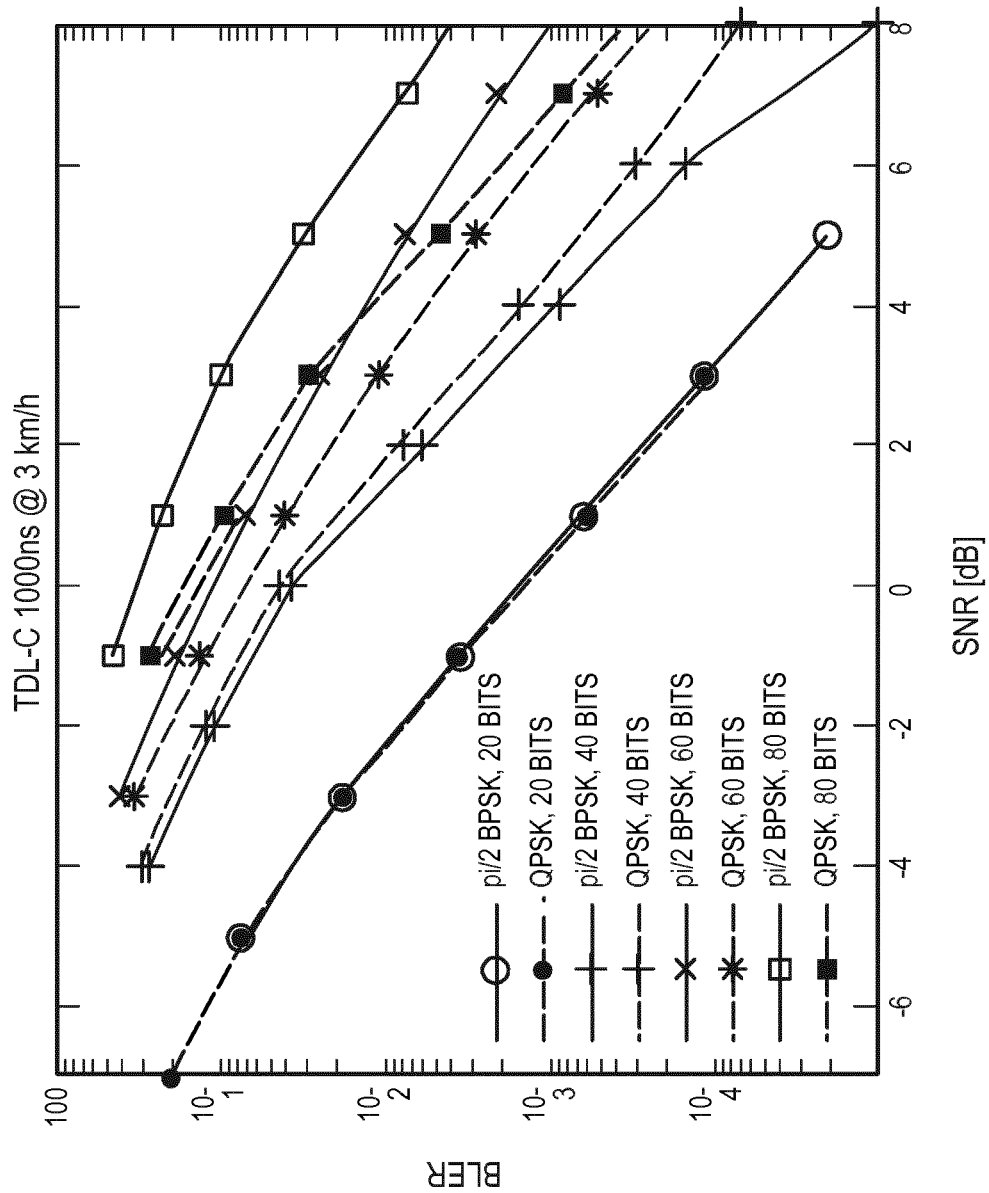

The fundamental reason why for some payload sizes in FIG. 2 QPSK is better than pi/2 BPSK is the underlying code rate: For low code rates halving the code rate leads to only 3 dB gain for QPSK, which is offset by 3 dB noise increase of the complex QPSK modulation.

Figure 3:
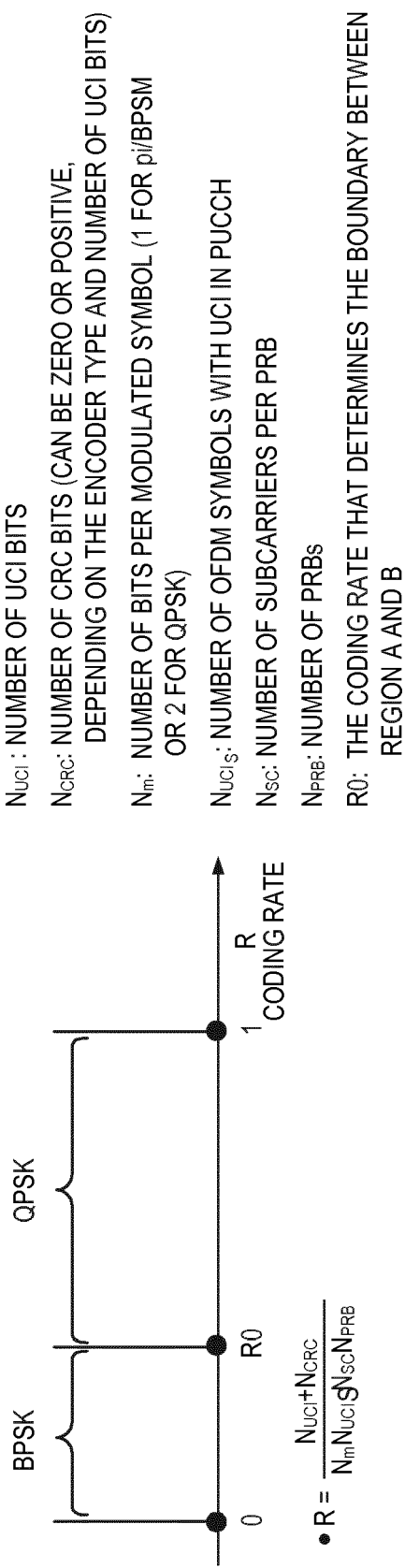
FIG. 3 is a diagram of a threshold for switching between BPSK and QPSK modulation techniques, as a function of coding rate.

To always have best performance, according to embodiments described herein the modulation technique (pi/2 BPSK or QPSK) is selected based on the code rate. For code rates below a threshold (e.g., R0 in FIG. 3) pi/2 BPSK modulation is preferred, while for code rates equal or above this threshold, QPSK is preferred (the threshold and code rate are based on the same assumed modulation technique, either based on assuming pi/2 BPSK or QPSK mapping). Let us assume the threshold R0 is based on QPSK and the actual coding rate obtained with QPSK modulation is $R_{QPSK}$. If $R_{QPSK}$<R0 pi/2 BPSK modulation is used (the actual code rate would then be $2R_{QPSK}$), otherwise QPSK. The code rate and threshold could of course also have been based on pi/2 BPSK.

The threshold value can either be fixed in the specification or configured. Configuration is preferably accomplished using Radio Resource Control (RRC) signaling. The PUCCH code rate is defined as UCI input bits (plus CRC bits if present) divided by number of coded UCI bits.

A simpler solution could be to just inspect the number of coded bits (again assuming a modulation technique), and based on the number of coded bits select pi/2 BPSK or QPSK. For coded bits equal or below a threshold (assuming the same modulation technique as for the coded bits) QPSK is selected, while for coded bits above the threshold, BPSK is selected. This embodiment is slightly simpler (the code rate needs not to be calculated) but it is also less accurate than basing the decision on the code rate. Even if the number of coded bits is large (and therefore pi/2 BPSK is used), together with a very large number of UCI bits the code rate might actually be quite high, favoring QPSK. Other parameters related to coded bits are PUCCH bandwidth, PUCCH length, number of PUCCH modulation symbols, number of PUCCH resource elements used for UCI, number of PUCCH OFDM symbols carrying UCI: An increase of any of these parameters also increases the number of coded bits, the threshold could therefore also be based on any of these parameters.

Another simple solution is to base the modulation technique selection (pi/2 BPSK or QPSK) on the UCI payload, or the bits of data to be transmitted, prior to encoding. Assuming a certain reference number of coded bits, a UCI payload size leads to a code rate. For UCI payload sizes below a threshold, pi/2 BPSK modulation is used, while for UCI payload sizes equal or above this threshold, QPSK is used. Also here the advantage is simplicity but reduced performance. A small payload size together with an actual number of coded bits smaller than the assumed reference leads to high code rate favoring QPSK.

Generally, the modulation technique (pi/2 BPSK or QPSK) for long PUCCH is based on at least one of PUCCH code rate, payload size, PUCCH bandwidth, PUCCH length, number of PUCCH modulation symbols, number of PUCCH resource elements used for UCI, number of PUCCH OFDM symbols carrying UCI. Preferable, the PUCCH modulation technique is selected based on PUCCH code rate.

The threshold can either be specified in the standard or signaled to the UE. Signaling to the UE would preferably done via semi-static configuration and RRC signaling, but is not limited to these options. Different PUCCH configurations or PUCCH formats can have different threshold values configured. In one embodiment, RRC configures a set of different threshold values and dynamic signaling (e.g. contained in the downlink assignment scheduling the downlink data transmission which HARQ feedback is (part of) the UCI payload) selects one of the configured thresholds. In another embodiment, as part of the PUCCH configuration, a certain PUCCH is configured to always use pi/2 BPSK or QPSK. In still another embodiment, dynamic signaling (e.g. contained in the downlink assignment scheduling the downlink data transmission which HARQ feedback is (part of) the UCI payload) selects the modulation technique.

Another possibility is (either configured or hardcoded in the spec) (a set of) tables that map UCI payload size to modulation technique. Below tables are for PUCCH bandwidth 1, 2, and 3 PRB and assume a PUCCH length of 14 symbols. For other combinations of PUCCH bandwidth and length additional tables can be defined.

TABLE 1

Modulation Techniques based on UCI payload for various PUCCH Configurations

| UCI payload | Modulation technique | UCI payload | Modulation technique | UCI payload | Modulation technique |
|---|---|---|---|---|---|
| <X1 bit | pi/2 BPSK | <X2 bit | pi/2 BPSK | <X3 bit | pi/2 BPSK |
| ≥X1 bit | QPSK | ≥X2 bit | QPSK | ≥X3 bit | QPSK |
| PUCCH bandwidth 1 PRB, PUCCH length 14 symbols | | PUCCH bandwidth 2 PRB, PUCCH length 14 symbols | | PUCCH bandwidth 3 PRB, PUCCH length 14 symbols | |

In one example, the modulation technique used can be conditioned on the UCI type or for some of the UCI types; the modulation can be fixed and a default value. For example, if the UCI bits are HARQ-ACK, pi/2 PBSK can be used. If the UCI bits are CSI/CQI feedback, QPSK is used irrespective of the coding rate.

Another example is a combination of the above, for example the UE uses QPSK for the PUCCH that carries only CQI bits and uses pi/2 BSPK or QPSK based on the previous embodiment when only HARQ-ACK or the combination of different types of UCI bits are used. These types of solutions are useful when in particular different PUCCH from the same UE are multiplexed in time for example.

Instead of always using a fixed modulation technique for a certain UCI type (mix) as explained in the previous paragraph, in one embodiment different thresholds are used for different UCI type (mix). Different UCI types can have different error performance requirements, also this could be a reason to have UCI-type-specific thresholds. For above set of tables this would imply multiple such sets, different sets for different UCI types and UCI type mixes.

In another embodiment, the requirements on the transmit power can be the condition whether pi/2 PBSK is beneficial to use. That can be determined by the regulations. For example, in some deployments the gain by low PAPR or CM is only beneficial if UE operates close to given max power. If due to regulation or other requirements the UE is not allowed to operate with that max power, the operation can be simplified and UE only uses the default modulation, being QPSK here. In another example if PUCCH transmission follows another transmission, for example PUSCH, and the choice of pi/2 PBSK results in an increased power which can create other problems such as power transients, the UE uses the default modulation, e.g. QPSK.

In another example, the condition to use a default modulation can be the deployment scenario. For example, a UE with good coverage can rely on the fixed modulation, e.g. QPSK here. However if the network determines that improvement in link is needed, the condition will be changed and the UE can use pi/2 BPSK as well according to the above embodiment.

As discussed above, even though embodiments have been described herein in the context of a PUCCH transmission, the selection between modulation technique with different PAPR or CM (e.g. pi/2 BPSK and QPSK) depending on a code rate (or a parameter impacting code rate) is applicable to other physical channels applying channel coding.

Figure 4:
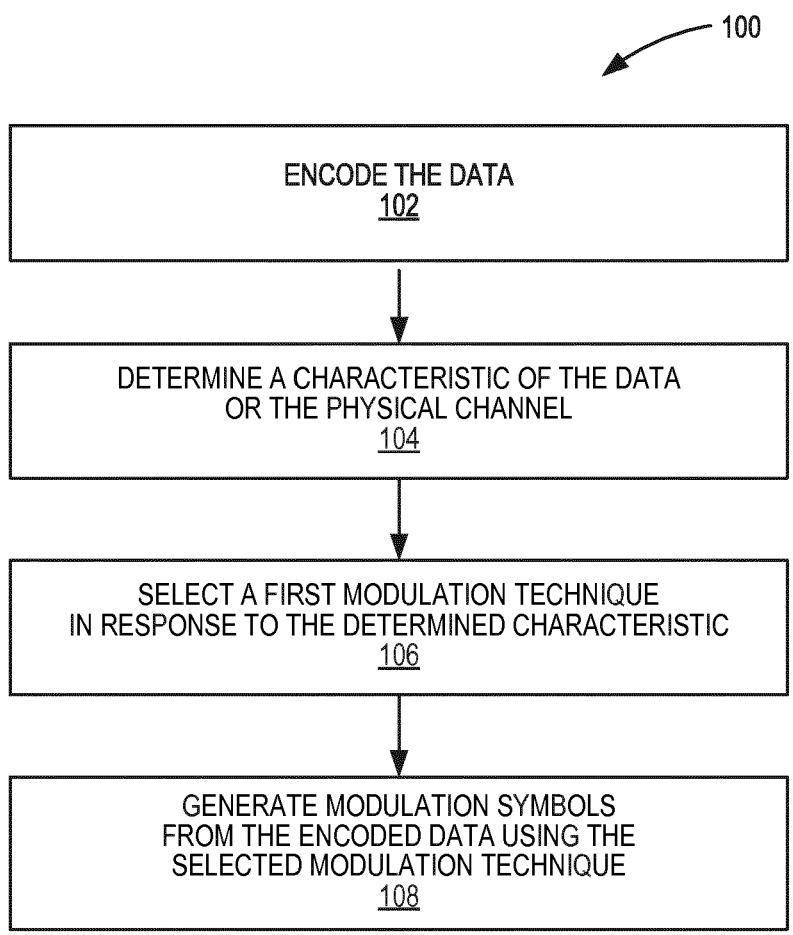
FIG. 4 is a flow diagram of a method of selecting a modulation technique for transmitting data across a physical channel.

FIG. 4 depicts a method 100 performed by a wireless device of selecting a modulation technique for transmitting data across a physical channel, in accordance with particular embodiments. The method includes encoding the data to be transmitted (block 102), such as UCI. A modulation technique (e.g., pi/2 BPSK or QPSK) is assumed for the encoding operation. A characteristic of the data or the physical channel is determined (block 104). The characteristic may comprise, for example, the physical channel code rate, payload size, the physical channel bandwidth, the physical channel length, number of the physical channel modulation symbols, or number of the physical channel resource elements used for the data. Either a first or second modulation technique (e.g., pi/2 BPSK or QPSK) is selected in response to the determined characteristic (block 106). Modulation symbols are generated from the encoded data using the selected modulation technique (block 108).

Figure 5:
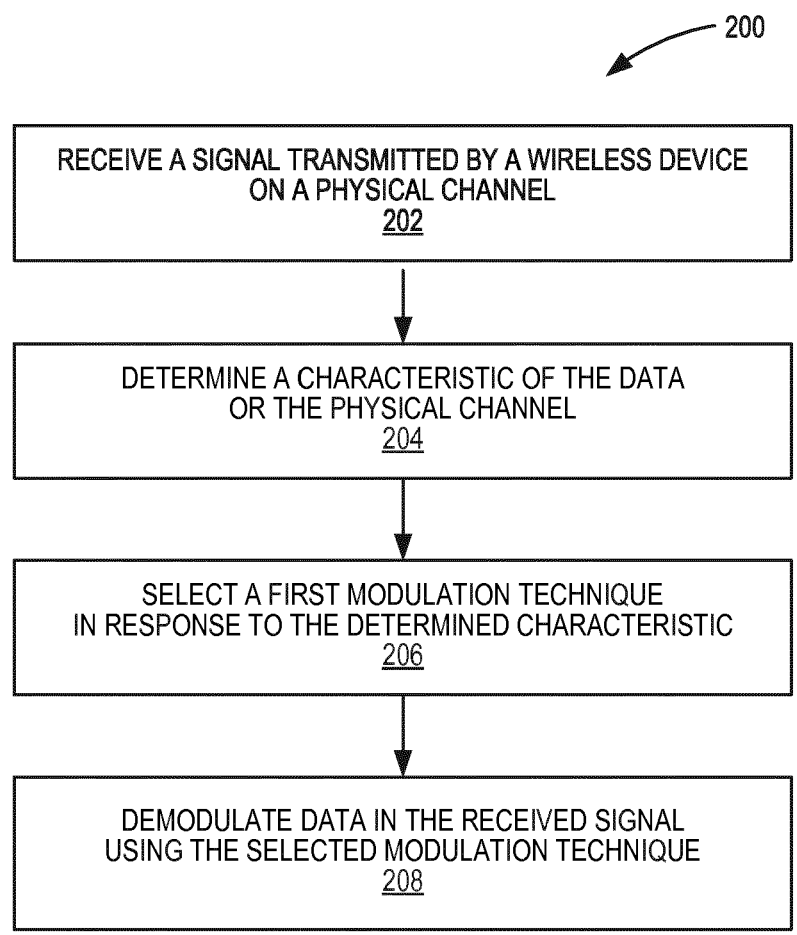
FIG. 5 is a flow diagram of a method of receiving a data transmitted across a physical channel.

FIG. 5 depicts a method 200 performed by a base station of receiving a data transmitted across a physical channel, in accordance with particular embodiments. The method includes receiving a signal transmitted by a wireless device on a physical channel (block 202). A characteristic of the data or the physical channel is determined (block 204). The characteristic may comprise, for example, the physical channel code rate, payload size, the physical channel bandwidth, the physical channel length, number of the physical channel modulation symbols, or number of the physical channel resource elements used for the data. Either a first or second modulation technique (e.g., pi/2 BPSK or QPSK) is selected in response to the determined characteristic (block 206). Data in the received signal are demodulated using the selected modulation technique (block 108).

Note that apparatuses described herein may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
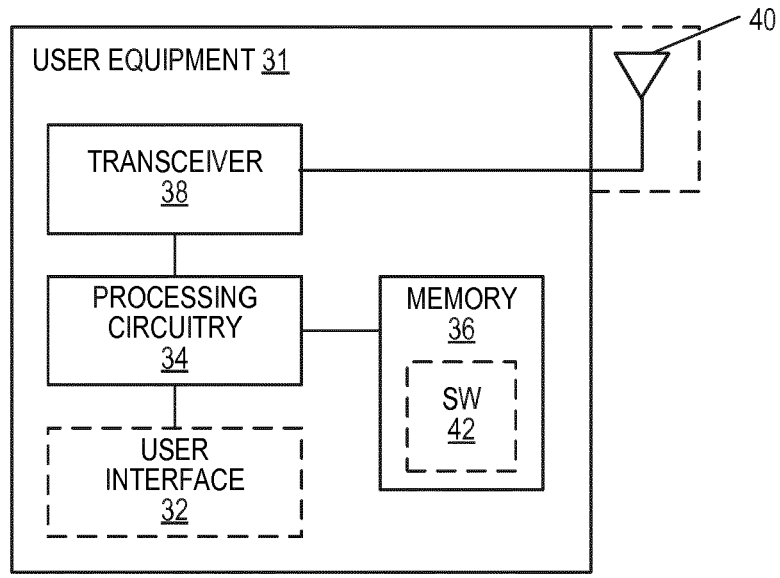
FIG. 6 is a block diagram of User Equipment.

FIG. 6 depicts a radio network device such as a User Equipment 31 operative in a wireless communication network. A User Equipment 31 is any type device capable of communicating with a network node such as a base station, and/or a WLAN access point using radio signals. A User Equipment 31 may therefore refer to a machine-to-machine (M2M) device, a machine-type communications (MTC) device, a Narrowband Internet of Things (NB IoT) device, etc. The User Equipment (UE) may also be a conventional user terminal, such as a cellular telephone or "smartphone." A User Equipment 31 may also be referred to as a radio device, a radio communication device, a radio network device, a wireless terminal, or simply a terminal—unless the context indicates otherwise, the use of any of these terms is intended to include device-to-device UEs or devices, machine-type devices, or devices capable of machine-to-machine communication, sensors equipped with a radio network device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be configured to transmit and/or receive data without direct human interaction.

In some embodiments, the User Equipment 31 includes a user interface 32 (display, touchscreen, keyboard or keypad, microphone, speaker, and the like); in other embodiments, such as in many M2M, MTC, or NB IoT scenarios, the User Equipment 31 may include only a minimal, or no, user interface 32 (as indicated by the dashed lines of block 32 in FIG. 6). The User Equipment 31 also includes processing circuitry 34; memory 36; and radio circuits, such a transceiver 38, one or more antennas 40, and the like, to effect wireless communication across an air interface to one or more radio network nodes and/or access points. As indicated by the dashed lines, the antenna(s) 40 may protrude externally from the UE 31, or the antenna(s) 40 may be internal. The UE 31 may additionally include features such as a camera, accelerometer, satellite navigation signal receiver circuitry, vibrating motor, and the like (not depicted in FIG. 6).

According to embodiments described herein, the memory 36 is operative to store, and the processing circuitry 34 operative to execute, software 42 which when executed is operative to cause the radio UE 31 to select a modulation technique based on a characteristic of data to be transmitted and a physical channel, as described and claimed herein. In particular, the software 42, when executed on the processing circuitry 34, is operative to perform the method 100 described and claimed herein. This allows the UE 31 to increase the physical channel performance, either by enabling higher payload sizes or improved coverage.

Figure 7:
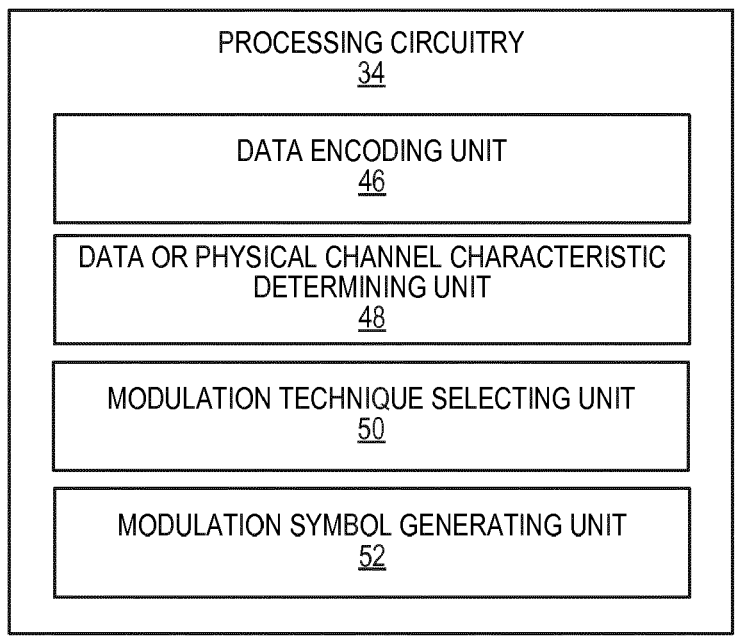
FIG. 7 is a diagram of processing circuitry in the UE of FIG. 6, operative to execute the method of FIG. 4.

FIG. 7 illustrates example processing circuitry 34, such as that in the UE 31 of FIG. 6. The processing circuitry 34 comprises a plurality of physical units. In particular, the processing circuitry 34 comprises a data encoding unit 46, a data or physical channel characteristic determining unit 48, a modulation technique selecting unit 50, and a modulation symbol generating unit 52.

The data encoding unit 46 is configured to encode data to be transmitted. The data is encoded assuming a modulation technique, such as pi/2 BPSK or QPSK. The data or physical channel characteristic determining unit 48 is configured to determine a characteristic of the data to be transmitted or the physical channel. For example, the characteristic may be the code rate, payload size, physical channel bandwidth, physical channel length, number of physical channel modulation symbols, or number of physical channel resource elements used for the data to be transmitted. The modulation technique selecting unit 50 is configured to select a modulation technique (e.g., pi/2 BPSK or QPSK) in response to the determined characteristic. For example the determined characteristic may be compared to a fixed, preconfigured, or signaled threshold value. Once the modulation technique is selected, the modulation symbol generating unit 52 is configured to generate modulation symbols for transmission, using the selected modulation technique.

Those skilled in the art will also appreciate that embodiments herein further include corresponding computer programs, such as software 42 stored in memory 36 and executed by processing circuitry 34.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 8:
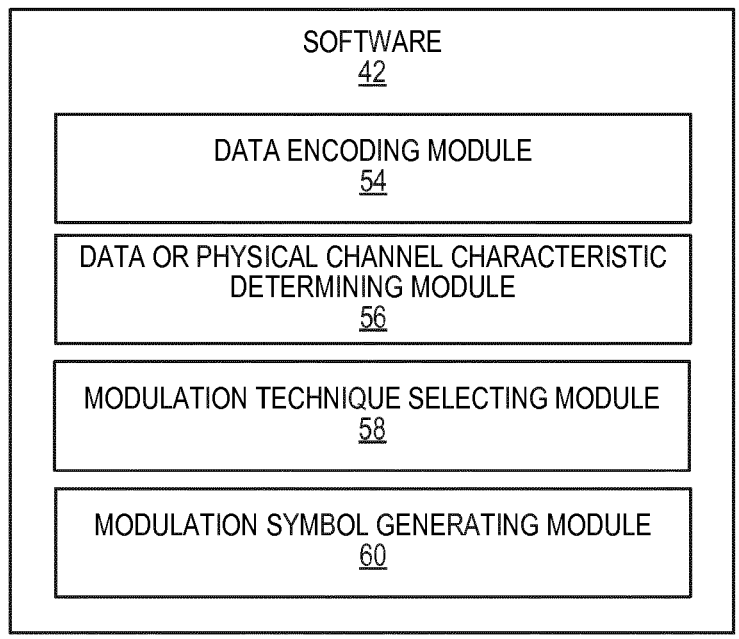
FIG. 8 is a diagram of software modules operative to execute the method of FIG. 4 when executed by processing circuitry in the UE of FIG. 6.

In particular, FIG. 8 illustrates example software 42, such as that in memory 36 in the UE 31 of FIG. 6. The software 42 comprises a plurality of software modules. In particular, the software 42 comprises a data encoding module 54, a data or physical channel characteristic determining module 56, a modulation technique selecting module 58, and a modulation symbol generating module 60.

The data encoding module 54 is configured to encode data to be transmitted. The data is encoded assuming a modulation technique, such as pi/2 BPSK or QPSK. The data or physical channel characteristic determining module 56 is configured to determine a characteristic of the data to be transmitted or the physical channel. For example, the characteristic may be the code rate, payload size, physical channel bandwidth, physical channel length, number of physical channel modulation symbols, or number of physical channel resource elements used for the data to be transmitted. The modulation technique selecting module 58 is configured to select a modulation technique (e.g., pi/2 BPSK or QPSK) in response to the determined characteristic. For example the determined characteristic may be compared to a fixed, preconfigured, or signaled threshold value. Once the modulation technique is selected, the modulation symbol generating module 60 is configured to generate modulation symbols for transmission, using the selected modulation technique.

Figure 9:
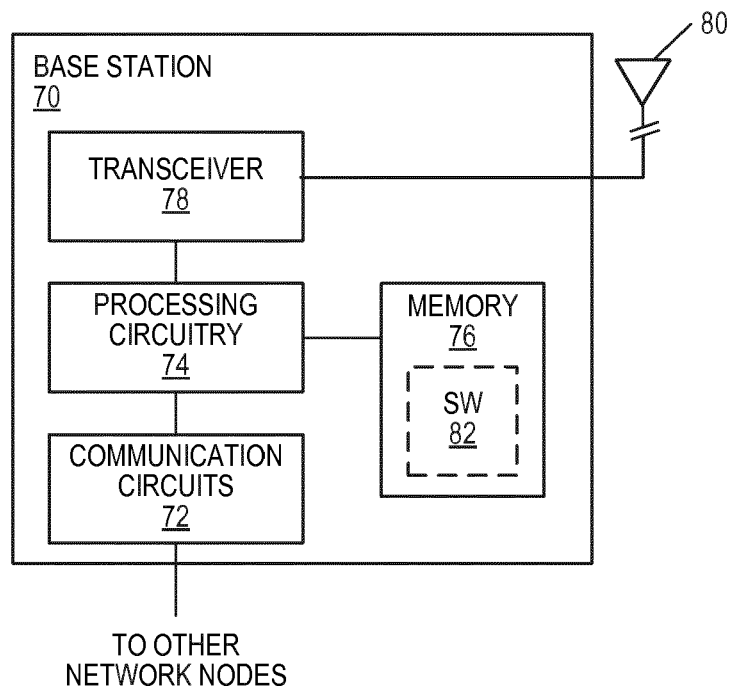
FIG. 9 is a block diagram of a base station.

FIG. 9 depicts a base station 70 operative in a wireless communication network. The base station 70 includes communication circuits 72 operative to exchange data with other network nodes; processing circuitry 74; memory 76; and radio circuits, such as a transceiver 78, one or more antennas 80, and the like, to effect wireless communication across an air interface to one or more radio network devices, such as UE 31. As indicated by the broken connection to the antenna(s) 80, the antenna(s) 80 may be physically located separately from the base station 70, such as mounted on a tower, building, or the like. Although the memory 76 is depicted as being separate from the processing circuitry 74, those of skill in the art understand that the processing circuitry 74 includes internal memory, such as a cache memory or register file. Those of skill in the art additionally understand that virtualization techniques allow some functions nominally executed by the processing circuitry 74 to actually be executed by other hardware, perhaps remotely located (e.g., in the so-called "cloud"). The base station 70 is known as eNB in LTE, or gNB in NR.

According to embodiments of the present invention, the memory 76 is operative to store, and the processing circuitry 74 is operative to execute, software 82 which when executed is operative to cause the base station 70 to receive a signal from a UE 31 on a physical channel, determine a characteristic of the data or the physical channel, select a modulation technique in response to the determined characteristic, and demodulate the data using the selected modulation technique, as described and claimed herein.

Figure 10:
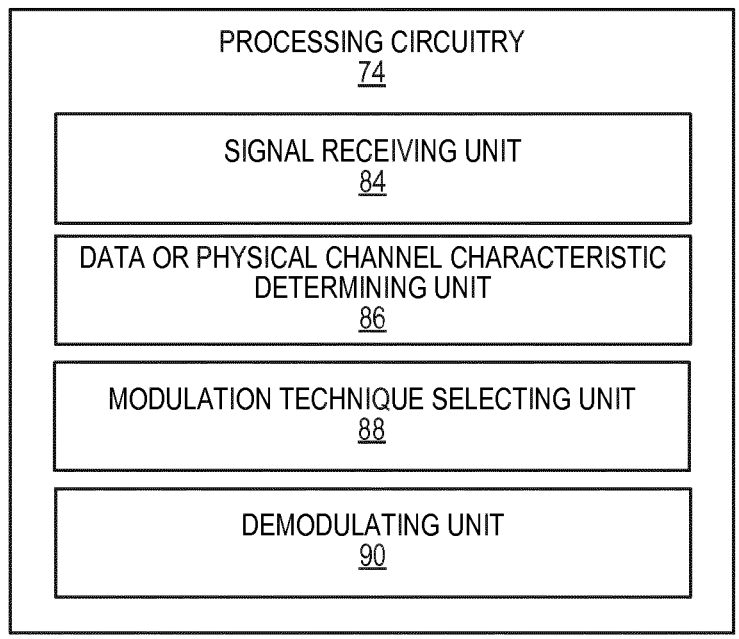
FIG. 10 is a diagram of processing circuitry in the base station of FIG. 9, operative to execute the method of FIG. 5.

FIG. 10 illustrates example processing circuitry 74, such as that in the base station 70 of FIG. 9. The processing circuitry 74 comprises a plurality of physical units. In particular, the processing circuitry 74 comprises a signal receiving unit 84, a data or physical channel characteristic determining unit 86, a modulation technique selecting unit 88, and a demodulating unit 90.

The signal receiving unit 84 is configured to receive a signal transmitted by a wireless device on a physical channel. The data or physical channel characteristic determining unit 86 is configured to determine a characteristic of the data transmitted or the physical channel. For example, the characteristic may be the code rate, payload size, physical channel bandwidth, physical channel length, number of physical channel modulation symbols, or number of physical channel resource elements used for the data to be transmitted. The modulation technique selecting unit 88 is configured to select a modulation technique (e.g., pi/2 BPSK or QPSK) in response to the determined characteristic. Once the modulation technique is selected, the demodulating unit 90 is configured to demodulate data in the received signal using the selected modulation technique.

Those skilled in the art will also appreciate that embodiments herein further include corresponding computer programs, such as software 82 stored in memory 76 and executed by processing circuitry 74.

Figure 11:
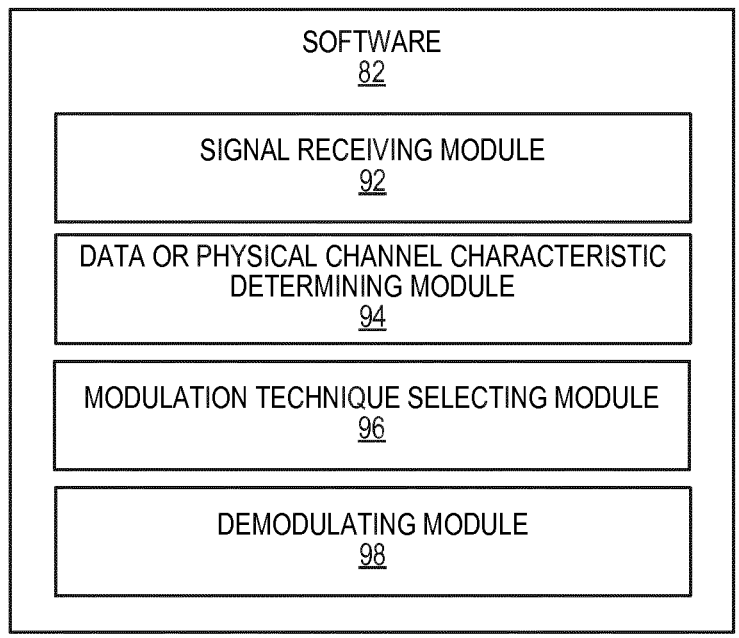
FIG. 11 is a diagram of software modules operative to execute the method of FIG. 5 when executed by processing circuitry in the base station of FIG. 9.

FIG. 11 illustrates example software 82, such as that depicted in the memory 76 of the base station 70 of FIG. 9. The software 82 comprises a plurality of software modules. In particular, the software 82 comprises a signal receiving module 92, a data or physical channel characteristic determining module 94, a modulation technique selecting module 96, and a demodulating module 98.

The signal receiving module 92 is configured to receive a signal transmitted by a wireless device on a physical channel. The data or physical channel characteristic determining module 94 is configured to determine a characteristic of the data transmitted or the physical channel. For example, the characteristic may be the code rate, payload size, physical channel bandwidth, physical channel length, number of physical channel modulation symbols, or number of physical channel resource elements used for the data to be transmitted. The modulation technique selecting module 96 is configured to select a modulation technique (e.g., pi/2 BPSK or QPSK) in response to the determined characteristic. Once the modulation technique is selected, the demodulating module 98 is configured to demodulate data in the received signal using the selected modulation technique.

In all embodiments, the processing circuitry 34, 74 may comprise any sequential state machine operative to execute machine instructions stored as machine-readable computer programs in memory 36, 76, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), or any combination of the above.

In all embodiments, the memory 36, 76 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the radio circuits may comprise one or more transceivers 38, 78 used to communicate with one or more other transceivers via a Radio Access Network (RAN) according to one or more communication protocols known in the art or that may be developed, such as IEEE 802.xx, CDMA, WCDMA, GSM, LTE, UTRAN, WiMax, NB-IoT, or the like. The transceiver 38, 78 implements transmitter and receiver functionality appropriate to the RAN links (e.g., frequency allocations and the like). The transmitter and receiver functions may share circuit components and/or software, or alternatively may be implemented separately.

In all embodiments, the communication circuits 72 may comprise a receiver and transmitter interface used to communicate with one or more other nodes over a communication network according to one or more communication protocols known in the art or that may be developed, such as Ethernet, TCP/IP, SONET, ATM, IMS, SIP, or the like. The communication circuits 72 implement receiver and transmitter functionality appropriate to the communication network links (e.g., optical, electrical, and the like). The transmitter and receiver functions may share circuit components and/or software, or alternatively may be implemented separately.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method, performed by a wireless device, of selecting a modulation technique for transmitting data across a physical uplink control channel, the method comprising:
   encoding the data to be transmitted across the physical uplink control channel;
   determining a code rate of the data;
   selecting a first or second modulation technique in response to the code rate, the first modulation technique being one of Binary Phase Shift Keying (BPSK) and pi/2 BPSK and the second modulation technique being Quadrature Phase Shift Keying (QPSK); and
   generating modulation symbols from the encoded data using the selected modulation technique.

2. The method of claim 1 wherein a plurality of candidate code rate threshold values is provisioned or signaled to the wireless device, and a selection of which code rate threshold to apply is dynamically signaled to the wireless device.

3. The method of claim 1 wherein selecting a first or second modulation technique in response to the code rate comprises comparing the determined code rate of the data to a threshold value, and selecting the first or second modulation technique in response to the threshold comparison.

4. A wireless device operative in a wireless communication network and further operative to select a modulation technique for transmitting data across a physical uplink control channel, the wireless device comprising:
   a transceiver;
   processing circuitry operatively connected to the transceiver, and adapted to:
      encode the data to be transmitted across the physical uplink control channel;
      determine a code rate of the data;
      select a first or second modulation technique in response to the code rate, the first modulation technique being one of Binary Phase Shift Keying (BPSK) and pi/2 BPSK and the second modulation technique being Quadrature Phase Shift Keying (QPSK); and
      generate modulation symbols from the encoded data using the selected modulation technique.

5. The wireless device of claim 4 wherein a plurality of candidate threshold values is provisioned or signaled to the wireless device, and a selection of which threshold to apply is dynamically signaled to the wireless device.

6. The wireless device of claim 4 wherein the processing circuitry is adapted to select a first or second modulation technique in response to the code rate by comparing the determined code rate of the data to a threshold value, and selecting the first or second modulation technique in response to the threshold comparison.

7. A method performed by a base station of receiving a data transmitted across a physical uplink control channel, the method comprising:
   receiving a signal transmitted by a wireless device on the physical uplink control channel;
   determining a code rate of the data;
   selecting a first or second modulation technique in response to the code rate, the first modulation technique being one of Binary Phase Shift Keying (BPSK) and pi/2 BPSK and the second modulation technique being Quadrature Phase Shift Keying (QPSK); and demodulating data in the received signal using the selected modulation technique.

8. The method of claim 7 further comprising signaling the code rate threshold to the wireless device.

9. The method of claim 7 wherein selecting a first or second modulation technique in response to the code rate comprises comparing the determined code rate of the data to a threshold value, and selecting the first or second modulation technique in response to the threshold comparison; and further comprising signaling the threshold value to the wireless device.

10. A base station operative in a wireless communication network wherein one or more wireless devices transmit modulated data across a physical uplink control channel to the base station, comprising:

a transceiver;

processing circuitry operatively connected to the transceiver, and adapted to receive a signal transmitted by a wireless device on the physical uplink control channel;

determine a code rate of the data;

select a first or second modulation technique in response to the code rate, the first modulation technique being one of Binary Phase Shift Keying (BPSK) and pi/2 BPSK and the second modulation technique being Quadrature Phase Shift Keying (QPSK); and demodulate data in the received signal using the selected modulation technique.

11. The base station of claim 10 wherein the processing circuitry is further adapted to, prior to receiving the signal, signal the threshold to the wireless device.

12. The base station of claim 10 wherein the processing circuitry is adapted to select a first or second modulation technique in response to the code rate by comparing the determined code rate of the data to a threshold value, and selecting the first or second modulation technique in response to the threshold comparison; and the processing circuitry is further adapted to, prior to receiving the signal, signal the threshold value to the wireless device.

\* \* \* \* \*